United States Patent
Pawlowski

[11] Patent Number: 5,905,996
[45] Date of Patent: May 18, 1999

[54] COMBINED CACHE TAG AND DATA MEMORY ARCHITECTURE

[75] Inventor: J. Thomas Pawlowski, Boise, Id.

[73] Assignee: Micron Technology, Inc., Boise, Id.

[21] Appl. No.: 08/681,674

[22] Filed: Jul. 29, 1996

[51] Int. Cl.⁶ .................................................. G06F 12/08
[52] U.S. Cl. ........................... 711/119; 711/128; 711/129; 711/5; 365/51; 365/205
[58] Field of Search ............................... 711/5, 119, 128, 711/129; 365/51, 205, 207, 208

[56] References Cited

U.S. PATENT DOCUMENTS

| | | | |
|---|---|---|---|
| 5,301,296 | 4/1994 | Mohri et al. .............................. | 711/128 |
| 5,353,424 | 10/1994 | Partovi et al. ........................... | 711/128 |
| 5,564,034 | 10/1996 | Miyake .................................... | 711/128 |

*Primary Examiner*—Reginald G. Bragdon
*Attorney, Agent, or Firm*—Thorp, Reed & Armstrong

[57] ABSTRACT

A cache memory circuit for use in a cache memory system having a predetermined width is comprised of a memory array divided into a cache data memory portion and a tag memory portion. The proportion of the tag memory portion with respect to the cache data memory portion is the same as the proportion of the cache data memory portion to the width of the cache memory system. Support circuitry is provided for reading information into and out of both of the memory portions. A method for laying out such a cache memory circuit is also disclosed.

23 Claims, 5 Drawing Sheets

COMBINED CACHE TAG AND DATA MEMORY ARCHITECTURE

BACKGROUND OF THE INVENTION

1. Field of the Invention

The present invention is directed generally to memory devices and, more particularly, to memory devices of the type used to provide cache memory in computer systems.

2. Description of the Background

In developing a computer system, it is known that modern processors are capable of operating at speeds which exceed the ability of memory devices to provide data and or instructions to the processor. To overcome such problems, and allow the processor to run at or near its clock speed, it is well known to provide cache memory. Cache memory is a small amount of memory, compared to the overall memory capacity of the system, which maintains the data or instructions which the computer is most likely to need. The cache memory is typically constructed of a faster, more expensive type of memory cell than is used for the bulk of the system memory requirements. Thus, there is a tradeoff between speed and cost. The more cache memory provided, the faster the system will be, and also the more costly.

A cache memory system is comprised of two memory components. A first memory component, which is the larger of the two components, is a memory which stores the data or instructions needed by the processor so that such information need not be retrieved from the main memory. A second memory component is referred to as the tag cache. The tag cache contains an address, or a portion of an address. When that address or portion of the address matches the address of data or instructions which the processor has requested, a "hit" is generated indicating that the information requested by the processor is in the cache memory system. Complicated systems have been developed to ensure the maximum number of hits.

A typical cache memory is implemented using a plurality of data RAMs and one or more tag RAMs. Generally, the depth of the tag RAM is one quarter of the depth of the data RAM. In most cache implementations since late 1994, the individual data RAMs have been wider devices than the tag RAMs. That results in a large difference in device sizes between the tag RAM and the data RAM. For example, a 256K byte cache for an Intel Pentium® processor requires two 32K×32 SRAMs and one tag RAM which can range in size from 8K×8 to 8K×16 depending upon the chosen implementation, i.e., the maximum amount of main memory to be supported in the system. The result of that example is that the data RAMs have a density of one M byte whereas the tag RAM has a density which ranges from 64K byte to 128K bytes. The ratio in density of the cache data RAM divided by the cache tag ram is a factor of 16 or 8, respectively.

At any one time, there exists an optimum memory density with regard to manufacturing costs. That density becomes the highest volume available device at that time. When the one M byte RAM is the most prevalent device for use as cache data RAMs, it will be because it is the most cost effective size of device to manufacture. However, the 64K byte or 128K byte tag will still be needed. Manufacturing a separate 64K byte or 128 K byte tag memory will clearly be an inefficient use of process equipment if the 1M byte RAM is the most cost effective device to manufacture.

Aspects of this problem have been addressed by integrating the entire tag memory and the entire data RAM into one memory chip. That results in an extremely wide memory device which is more costly to test. It also results in a device which has too large a density for the optimal manufacturing cost because the highest-volume cache size is determined by the most economic basic device. Thus, if two data RAMs and one tag RAM are combined into one device, it will be more than twice the density of the economic baseline solution. Device yield deteriorates rapidly as die size is increased beyond that "most economic" size.

Another way to address the problem is to incorporate the entire tag into one data RAM. That too is less efficient. It makes that RAM excessively wide, which increases test cost and die area. It requires that the tag be wasted in a system which needs multiple such devices in parallel. The latter problem can be solved by using one device which has the tag incorporated in parallel with another device which does not have the tag incorporated. However, that then results in two different silicon implementations and the accompanying overhead costs of design, qualification, etc. Thus, the need exists for a cost effective approach to providing tag cache devices which makes maximum use of currently available fabrication processes while at the same time eliminating the need to design, verify, and qualify a separate device.

SUMMARY OF THE INVENTION

The present invention is directed to a cache memory circuit for use in a cache memory system having a predetermined depth and width. The cache memory circuit is comprised of a memory array divided into a cache data memory portion and a tag memory portion. Support circuitry is provided for reading information into and out of both of the memory portions. A tag memory of the tag memory portion with respect to the cache data memory portion is the same as the proportion of the cache data memory portion to the width of the cache memory system. Thus, if two data rams are needed to provide the desired cache memory system width, the tag cache is split in half with one-half of the tag cache being incorporated into each of the two data rams.

By distributing the tag cache requirements amongst the data cache memories, a number of advantages follow. First, only one device type needs to be designed, verified, qualified, etc. Second, only one device needs to be inventoried by the manufacturer or the consumer. Third, total silicon area is reduced. For example, compare the silicon area of two 32K×32 RAMs+8K×8 RAM against two (32K× 32+8K=4) RAMs. The two latter chips have less area than the three former chips. Additionally, total packaging costs are reduced. System loading is reduced and the number of active pins is reduced. A reduction in the number of active pins also increases system reliability. Finally, the architecture of the present invention permits identical bus timing on tag and data RAMs which is very advantageous in a number of microprocessor applications. Those advantages and benefits of the present invention, and others, will become apparent from the Description of the Preferred Embodiments hereinbelow.

BRIEF DESCRIPTION OF THE DRAWINGS

For the present invention to be clearly understood and readily practiced, the present invention will be described in conjunction with the following figures wherein.

DESCRIPTION OF THE PREFERRED EMBODIMENTS

Figure 1:
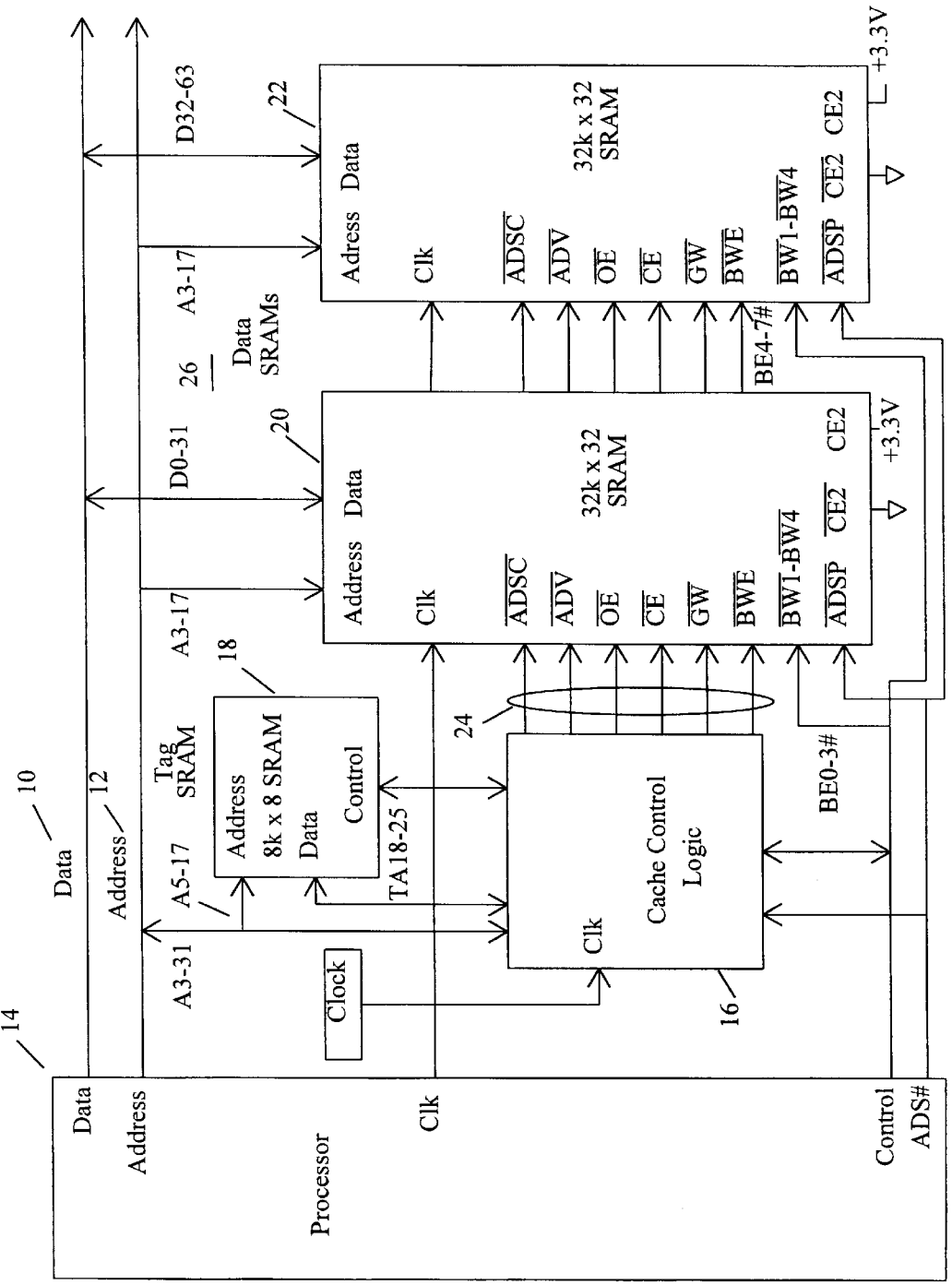
FIG. 1 is a block diagram of a prior art tag/data SRAM implementation in which the tag memory and the data memories are separate devices.

FIG. 1 is a block diagram of a prior art tag/data SRAM implementation in which the tag memory and the data memories are separate devices. In FIG. 1, an address bus 10 and a data bus 12 interconnect a microprocessor 14 with a cache control logic circuit 16, a tag cache 18, and data cache SRAMs 20, 22 in a standard manner. Cache control logic 16 provides control signals 24 which are input to the data cache SRAMs 20, 22 for controlling the operation thereof. The cache control logic circuit 16, tag cache 18, and data SRAMs 20, 22 form a cache subsystem 26.

Figure 2:
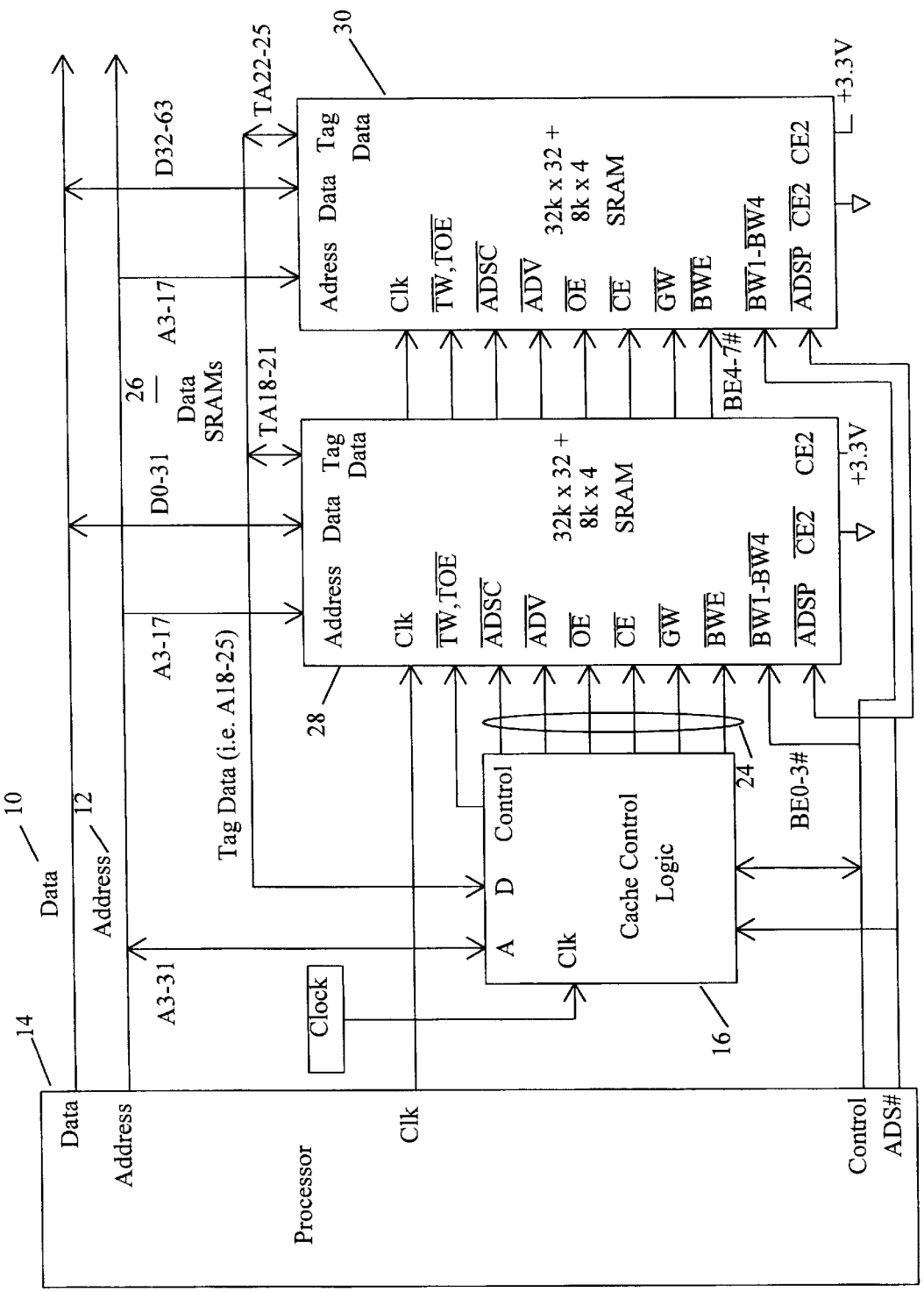
FIG. 2 is a block diagram of a tag/data SRAM implementation according to the teachings of the present invention wherein a portion of the tag memory is implemented in each of the data memories in the same proportion as each data memory bears to the desired width of the system.

FIG. 2 is a block diagram of a cache subsystem 26 implemented according to the teachings of the present invention. In FIG. 2, the tag cache 18 of FIG. 1 is implemented in the tag/data caches 28, 30, in the same proportion as each of the tag/data caches 28, 30 bears to the overall width of the cache subsystem 26. In other words, because two SRAMs 28, 30 are needed to implement the data portion of the cache subsystem 26, the tag is split equally in size and incorporated into the combined tag/data SRAMs.

Another way to view the present invention is to consider a cache memory subsystem having a cache data memory of width X and depth A, and a tag memory of width Y and a depth B. In such a cache subsystem, a plurality of memory devices are provided which together have a data width of X while each has a depth of A. Each such memory device is divided into a cache data memory portion having a width that is some fraction of X, and a tag memory portion having a width which is the same fraction of Y. The cache data memory portion of each memory device has a depth of A and the tag memory portion of each memory device has a depth of B.

The architecture of the present invention results in a number of advantages. First, only a single device type needs to be designed, verified, qualified, etc. Second, only one device needs to be inventoried by the manufacturer or the consumer.

Total silicon area is reduced. For example, compare the silicon area of two 32K×32 RAMs+one 8K×8 RAM versus two (32K×32+8K×4) RAMs; the two latter chips have less area than the three former chips.

Total packaging cost is reduced. Device packages come in standard sizes. For example, the 32K×32 SRAM can be mounted in either a 100-pin Thin Quad Flat Package (TQFP), a 119-pin Ball Grid Array Package (BGAP), or a 153-pin BGAP. The 8K×8 RAM is mounted in a 28-pin SOJ package. When the tag is incorporated into the data RAM, the 28-pin SOJ package is eliminated because sufficient unused pins remain in the TQFP or BGAP to accommodate the extra pins needed. Clearly, the elimination of one package is a reduction of overall packaging cost.

That argument holds true even if the tag is larger, given an intelligent choice of packaging. For example, if an 8K×16 tag is needed along with two 32K×32 data RAMs, and if the data RAMs are implemented in a 119-pin BGAP, the 153-pin BGAP could be used if insufficient free pins are available. The package size is identical to the 119-BGAP; the cost is virtually equal as well.

System loading is reduced. The elimination of a package means there are less signals for the system to drive, i.e. address bus buffers are shared between tag and data whereas when packaged separately, each device needs separate address buffers. Additionally, there are a reduced number of active pins. That increases system reliability. Finally, the architecture of the present invention permits identical bus timing on tag and data RAMs which is very advantageous in a number of microprocessor applications.

There are a number of ways to implement the architecture of the present invention. One way is to organize the memory array such that it has the same effective depth as the tag RAM. For example, a 32K×32+an 8K×4 can be laid out as an 8K×128+8K×4 device resulting in an internal architecture of 8K×132. Externally, though, the device looks like a 32K×32+8K×4 even though the array architecture is perfectly regular. An example of that approach is illustrated in FIG. 3.

Figure 3:
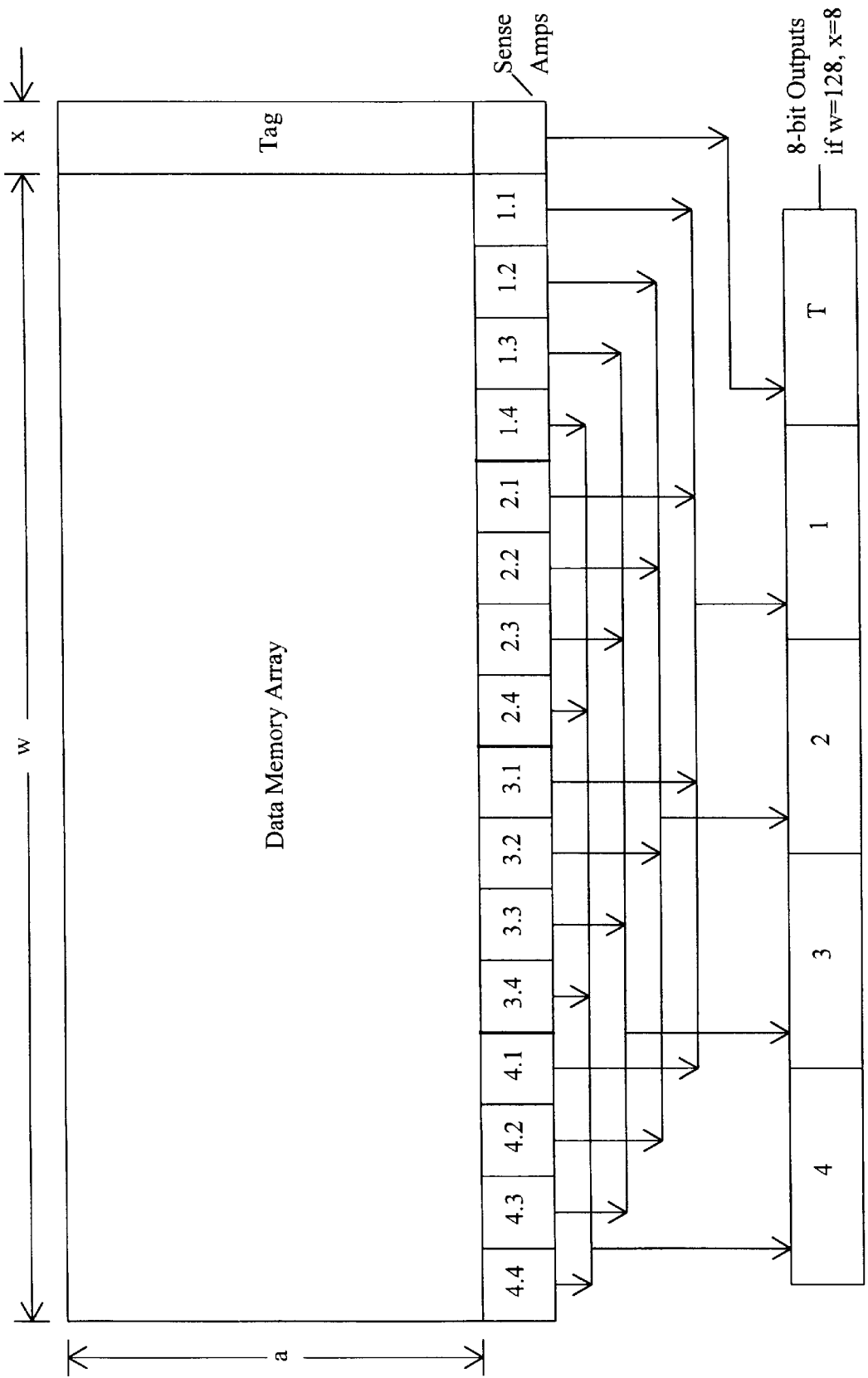
FIG. 3 illustrates a symmetrical array architecture for combining the tag and data memories in a single device.

FIG. 3 is an architecture diagram illustrating a symmetrical array architecture for combining the tag and data memories of a single device. FIG. 3 illustrates the architecture of the present invention arranged to include data routing to implement a 64K×32+16K×8 data/tag SRAM. In the architecture shown in FIG. 3, the data routing is identical for inputs and outputs. The dimension "a" is equal to the cache size in bits divided by the physical array width "w" in bits. For example, if the cache data memory size is two megabytes and the data array width w=128, a=16384, x=8, and tag size is a by 8 or 16K×8. Note that "a" and "w" are not intended to represent the physical number of rows and columns. "W", represents the number of sense amps in the data memory portion while a is the number of data bits divided by "w".

Another way to implement the concept of the present invention is to formulate the same sector and quadrant structure as one would have without the tag array, and combine the tag array in any convenient manner. That may mean that the utilized quadrant/sector structure differs between the tag and data RAM, i.e., the manner in which the memory cells are decoded with differ, however, the placement in the memory array would require less departure from the implementation without tag. For example, see FIG. 4.

Figure 4:
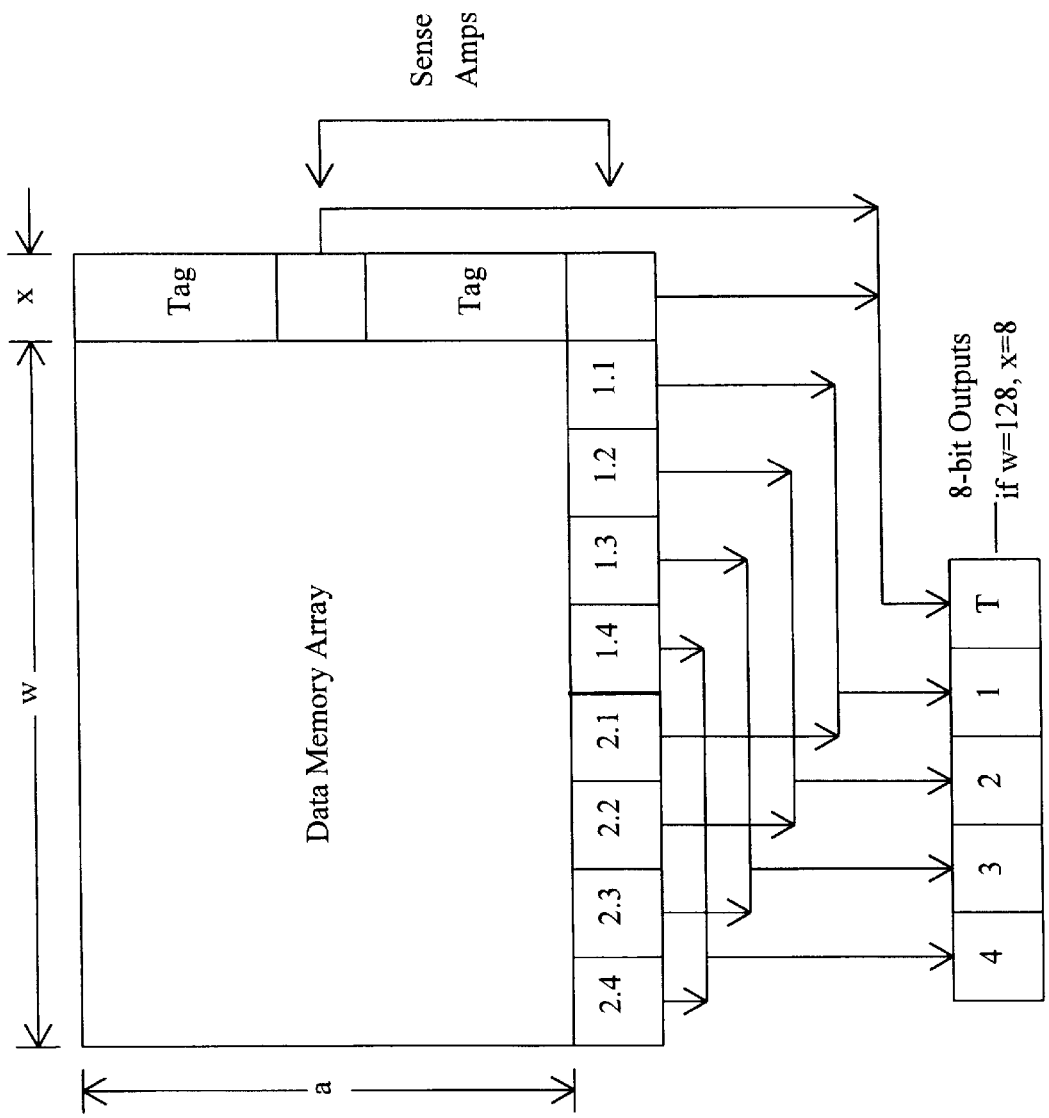
FIG. 4 illustrates an asymmetrical sense-amp array architecture for combining the tag and data memories in a single device.

FIG. 4 is an array architecture showing an asymmetrical sense amp concept including data routing to implement a 64K×32 +16K×8 data/tag SRAM. In FIG. 4, the tag portion of the array is incorporated into the data portion of an array with differing sector/quadrant structure. As in FIG. 3, data routing is identical for inputs and outputs. The dimension "a" is equal to the cache size in bits divided by the physical array width "w" in bits. For example, if the cache data memory size is 2 megabytes and w=64, a=32768, x=8 and tag size is 0.5a×8 or 16K×8.

Figure 5:
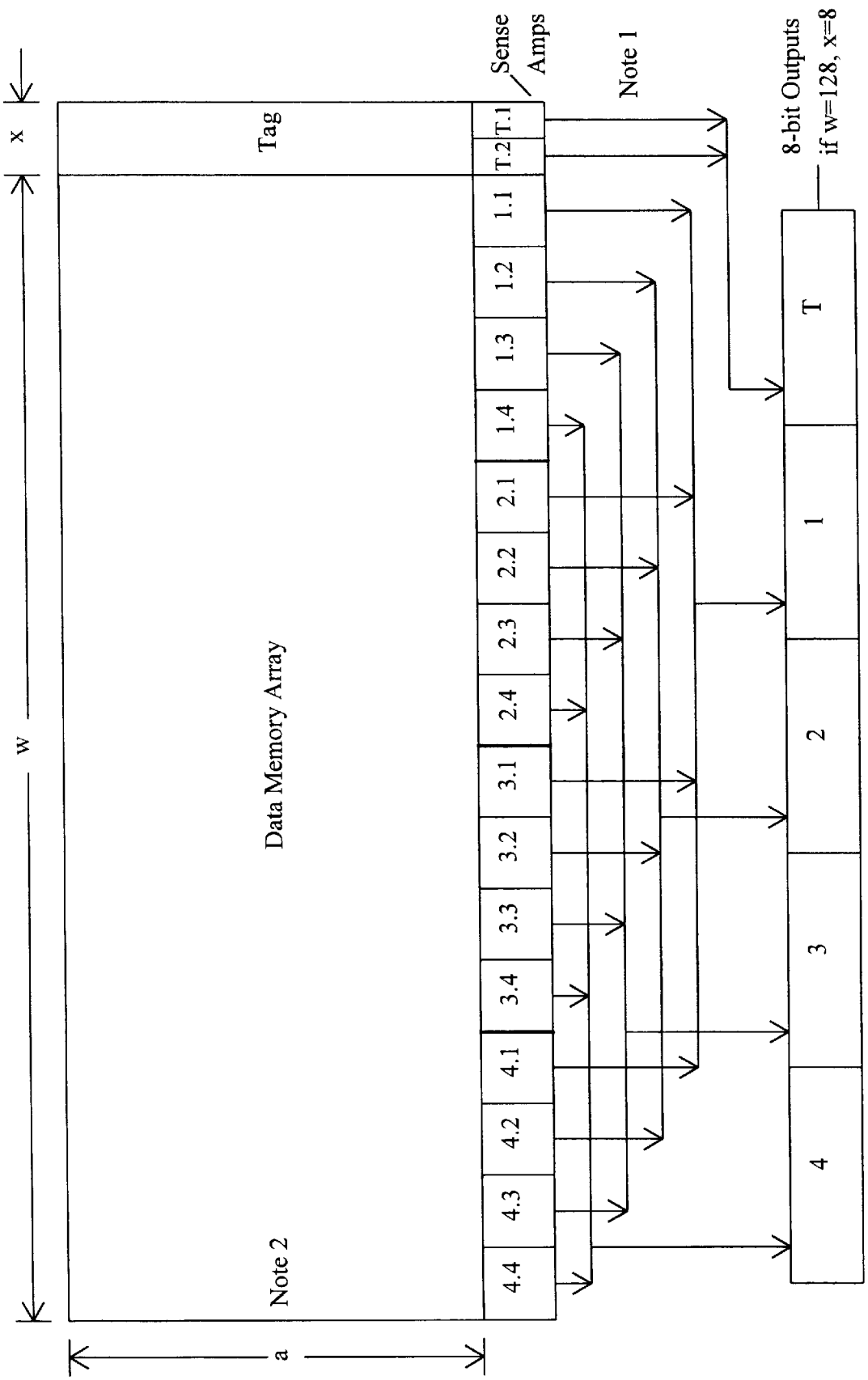
FIG. 5 illustrates an alternative symmetrical array architecture for combining the tag and data memories in a single device.

FIG. 5 illustrates a symmetrical array architecture including data routing to implement a 64K×32+32K×8 data/tag SRAM. FIG. 5, together with FIGS. 3 and 4, illustrate that the architecture of the present invention is applicable regardless of the multiplier of "a" in implementing a tag of any size relative to the data SRAM. In FIG. 5, if the cache data memory size is 2 megabytes and the data array width is 128, "a" is 16384, x=16, and the tag size is 2a×8 or 32K×8.

The present invention is also directed to a method of laying out a cache memory circuit comprised of a plurality of memory cells arranged in rows and columns. The method is comprised of the steps of allocating a first plurality of the memory cells for cache data. The cache data has a width of X. The second plurality of the memory cells is allocated for the cache tag, which has a width of Y. The value of X is some fraction of the total data cache requirements while the value of Y is the same fraction as the total tag cache requirements. The method is completed by layout of the cache control logic for reading information into and out of the memory cells.

While the present invention has been described in conjunction with preferred embodiments thereof, many modifications and variations will be apparent to those of ordinary skill in the art. For example, it is anticipated that many other circuit architectures of the type illustrated in FIGS. 3, 4, and 5 may be implemented according to the teachings of the present invention. The foregoing description and the following claims are intended to cover all such modifications and variations.

What is claimed is:

1. A cache memory circuit for use in a cache memory system, the cache memory system having a total cache data memory width and a total cache tag memory width, wherein the cache memory system has a predetermined width and is comprised of two or more cache memory circuits, each such cache memory circuit comprising:

a memory array divided into a cache data memory portion and a tag memory portion, wherein a ratio of the cache data memory width to the total cache data memory width is a predetermined proportion, and a ratio of the tag memory width to the total cache tag memory width is the predetermined proportion; and support circuitry for reading information into and out of both of said memory portions.

2. The circuit of claim 1 wherein said memory array is constructed of a plurality of data cells arranged in a plurality of rows and columns, and wherein said array has the same number of rows as the number of rows required by said tag memory portion.

3. The circuit of claim 1 wherein said cache data memory portion of said array is divided into a sector and quadrant structure, and wherein each said tag memory portion is incorporated into said sector and quadrant structure in a proportion corresponding to the predetermined proportion.

4. The circuit of claim 1 wherein said support circuitry includes sense amplifiers for reading information out of said tag memory portion, and wherein said sense amplifiers are arranged symmetrically with respect to said tag memory portion.

5. The circuit of claim 1 wherein said support circuitry includes sense amplifiers for reading information out of said tag memory portion, and wherein said sense amplifiers are arranged asymmetrically with respect to said tag memory portion.

6. A cache memory subsystem having a cache data memory of width x and a tag memory of width y, comprising:

a plurality of memory devices which together have a cache data width of x and a tag width of y, each memory device being divided into a cache data memory portion having a width that is a fraction of x, and a tag memory portion having a corresponding width which is said fraction of y; and cache control logic for controlling said plurality of memory devices.

7. The cache memory subsystem of claim 6 wherein each of said memory devices is constructed of a plurality of data cells arranged in a plurality of rows and columns, and wherein each said cache data memory portion has the same number of rows as the number of rows required by each said tag memory portion.

8. The cache memory subsystem of claim 6 wherein each said cache data memory portion is divided into a sector and quadrant structure, and wherein each said tag memory portion is incorporated into said sector and quadrant structure in a proportion corresponding to the fraction.

9. The cache memory subsystem of claim 6 wherein each of said plurality of memory devices includes support circuitry having sense amplifiers for reading information out of said tag memory portion, and wherein said sense amplifiers are arranged symmetrically with respect to said tag memory portion.

10. The cache memory subsystem of claim 6 wherein each of said plurality of memory devices includes support circuitry having sense amplifiers for reading information out of said tag memory portion, and wherein said sense amplifiers are arranged asymmetrically with respect to said tag memory portion.

11. A memory system having a cache data memory of width x and a tag memory of width y, comprising:

a plurality of memory means for storing data which together have a cache data width of x and a tag width of y, each memory means being divided into a cache data memory portion having a width that is a predetermined proportion of x, and a tag memory portion having a width which is an equivalent proportion of y; and cache control means for controlling said plurality of memory means.

12. The memory system of claim 11 wherein each of said memory means is constructed of a plurality of data cells arranged in a plurality of rows and columns, and wherein each said cache data memory portion has the same number of rows as the number of rows required by each said tag memory portion.

13. The memory system of claim 11 wherein each said cache data memory portion is divided into a sector and quadrant structure, and wherein each said tag memory portion is incorporated into said sector and quadrant structure in a proportion corresponding to the proportion.

14. The memory system of claim 11 wherein each of said plurality of memory means includes support circuit means having sense amplifier means for reading information out of said tag memory portion, and wherein said sense amplifier means are arranged symmetrically with respect to said tag memory portion.

15. The memory system of claim 11 wherein each of said plurality of memory means includes support circuit means having sense amplifier means for reading information out of said tag memory portion, and wherein said sense amplifier means are arranged asymmetrically with respect to said tag memory portion.

16. A system, comprising:

a microprocessor;

a plurality of memory devices which together have a cache data width of x and a cache tag width of y, each memory device being divided by a predetermined proportion into a cache data memory portion having a width that is some percentage of x, and a cache tag memory portion having a width which is said percentage of y; and cache control circuitry, responsive to said microprocessor, for controlling said plurality of memory devices.

17. The system of claim 16 wherein each of said memory devices is constructed of a plurality of data cells arranged in a plurality of rows and columns, and wherein each said cache data memory portion has the same number of rows as the number of rows required by each said cache tag memory portion.

18. The system of claim 16 wherein each said cache data memory portion is divided into a sector and quadrant structure, and wherein each said cache tag memory portion is incorporated into said sector and quadrant structure.

19. A method of laying out a cache memory circuit comprised of a plurality of memory cells arranged in a plurality of rows and columns, comprising the step of:

allocating a first plurality of said memory cells as cache data having a width of x and a second plurality of said memory cells as cache tag having a width of y, wherein x is a predetermined fraction of the total data cache requirements and y is said fraction of the total tag cache requirements calculated as a proportion equivalent to fraction x.

20. The method of claim 19 additionally comprising the step of specifying the number of rows in the array to be the same number as the number of rows required by said cache tag.

21. The method of claim 19 additionally comprising the step of dividing the array into a sector and quadrant structure, and the step of incorporating said cache tag into said sector and quadrant structure.

22. The method of claim 19 wherein said step of laying out the cache control logic includes the step of laying out sense amplifiers symmetrically with respect to said cache tag for reading information out of said cache tag.

23. The method of claim 19 wherein said step of laying out the cache control logic includes the step of laying out sense amplifiers asymmetrically with respect to said cache tag for reading information out of said cache tag.

* * * * *

UNITED STATES PATENT AND TRADEMARK OFFICE
CERTIFICATE OF CORRECTION

PATENT NO. : 5,905,996
DATED : May 18, 1999
INVENTOR(S) : J. Thomas Pawlowski

It is certified that error appears in the above-indentified patent and that said Letters Patent is hereby corrected as shown below:

```
Column 2, line 32, add --proportion--after memory at second occurrence.
Column 2, line 47, replace 32+8K=4) with 32+8Kx4).
Column 4, line 36, delete --,-- after "W".
```

Signed and Sealed this

Nineteenth Day of October, 1999

Attest:

Q. TODD DICKINSON

Attesting Officer

Acting Commissioner of Patents and Trademarks